(12) United States Patent
Combs et al.

(10) Patent No.: US 7,058,508 B2
(45) Date of Patent: Jun. 6, 2006

(54) AUTOMATED BUILDING SERVICE BROKER

(75) Inventors: Richard Combs, Plantation, FL (US); Walter Flugel, Boca Raton, FL (US)

(73) Assignee: Energy Control Technologies, Fort Lauderdale, FL (US)

( * ) Notice: Subject to any disclaimer, the term of this patent is extended or adjusted under 35 U.S.C. 154(b) by 960 days.

(21) Appl. No.: 09/759,945

(22) Filed: Jan. 12, 2001

(65) Prior Publication Data

US 2002/0095323 A1 Jul. 18, 2002

(51) Int. Cl.
G01C 21/00 (2006.01)
G06F 17/00 (2006.01)

(52) U.S. Cl. .............................. 701/213; 705/7; 705/8; 705/9; 701/214

(58) Field of Classification Search ................ 705/7–9; 707/101; 701/213–214
See application file for complete search history.

(56) References Cited

U.S. PATENT DOCUMENTS

| 4,922,514 | A | | 5/1990 | Bergeron et al. |
| 5,790,634 | A | | 8/1998 | Kinser et al. |
| 5,870,667 | A | * | 2/1999 | Globuschutz ............... 455/419 |
| 5,920,846 | A | | 7/1999 | Storch et al. |
| 6,366,919 | B1 | * | 4/2002 | O'Kane et al. .............. 707/101 |
| 6,742,141 | B1 | * | 5/2004 | Miller .......................... 714/26 |

FOREIGN PATENT DOCUMENTS

| JP | 11158232 A | * | 6/1999 |
| JP | 11335020 A | * | 12/1999 |
| JP | 11335021 A | * | 12/1999 |

OTHER PUBLICATIONS

"SnapTrack and US West Wireless demonstrate location technology created to meet phase II requirements of the FCC's enhanced 911 mandate", Aug. 1998; RCR Radio Communications Report, v 17, n 34, p. 23; Dialog File 01626989.*

Kuperberg "Cooper Square uses technology to enhance residential management"; Mar. 2000; Real Estate Weekly, 46, 31, 15; Dialog File 148, Accession No. 11907784.*

Gentry "Preventive monitoring: constant monitoring of buildings as they age, with fiber-optic sensors and computers, can extend their life and lower their cost"; Oct. 1994; Progressive Architecture, v75, n10, p. 96(4); Dialog File 148 Accession. 07581309.*

(Continued)

Primary Examiner—Romain Jeanty
(74) Attorney, Agent, or Firm—Akerman Senterfitt

(57) ABSTRACT

An automated building service broker can include a Global Positioning System (GPS) data processor for processing GPS data associated with communicatively linked service providers wherein the GPS data corresponds to a geographic position. The automated service broker also can include an event handler for responding to maintenance and repair events received from communicatively linked building systems. Finally, the automated building service broker can include a service provider selector for selecting a particular service provider to respond to a particular received maintenance and repair event received from a particular communicatively linked building system. More particularly, the service provider can be selected based on whether the selected service provider is suitable to perform required maintenance and repair on the particular communicatively linked building system, and the geographic position of the particular service provider relative to the particular building system as reported by GPS data associated with the particular service provider.

42 Claims, 3 Drawing Sheets

OTHER PUBLICATIONS

Dialog "Peregrine Systems Introduces Fully Integrated Solution for Facilities Management"; Oct. 1999; PR Newswire, p. 8824, Dialog File 16, Accession No. 06689393.*

* cited by examiner

AUTOMATED BUILDING SERVICE BROKER

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of building automation and more particularly to a system and method for automated building service brokering.

2. Description of the Related Art

Large building complexes such as office buildings and warehouses have various systems and devices that require monitoring, periodic maintenance, and repair when problems arise. For example, building air conditioning systems, smoke detection systems, fire alarm systems, security systems, lighting systems, and medical monitoring, each need to be monitored to ensure that each is operating properly. Additionally, each system must be repaired when problems arise and, generally, each system can require periodic maintenance to ensure that the system is in working order in addition to alarm notification.

Typically, building management professionals maintain maintenance records which can indicate scheduled (preventative) maintenance and routine repair. Such records can be used to remind building management to schedule service providers to perform routine, preventative maintenance and repair on the various building systems. Moreover, when routine, preventative maintenance and repairs have been completed, a maintenance record can be updated in which the performed maintenance is noted as well as the date on which the maintenance or repair was performed. Additionally, when a building system experiences a failure, a service provider can be contacted and alerted of the need for unscheduled repair (or alarm condition). When the necessary repairs have been completed, a repair record can be updated in which the performed repair is noted as well as the date on which the repair or maintenance was performed with this information archived in a data base.

Presently, such maintenance and repair records are created and updated manually. Manually monitoring building systems for scheduled and unscheduled maintenance and repairs can be a complicated and time consuming task that requires intervention of dispatching personnel. Similarly, scheduling required periodic maintenance and unscheduled repairs for multiple building systems can be even a more complicated and time-consuming task. These tasks become even more difficult when multiple building or locations are involved. Therefore, automating monitoring systems for multiple building or locations can be useful.

Currently, various automated systems exist for monitoring building systems. For example, U.S. Pat. No. 4,922,514 to Bergeron et al. for METHOD AND APPARATUS FOR DISPATCHING SERVICES discloses a method and system for the dispatch of resources to remote sites in response to alarm signals. More particularly, in Bergeron, a control system can access a database of field service engineers designated to provide services to particular remote sites in response to alarm signals received from those sites. Subsequently, the control system can repeatedly and sequentially attempt to establish communications with designated field service engineers in the database in order to request servicing of the detected alarm signals.

By comparison, U.S. Pat. No. 5,920,846 to Storch et al. for METHOD AND SYSTEM FOR PROCESSING A SERVICE REQUEST RELATING TO INSTALLATION, MAINTENANCE OR REPAIR OF TELECOMMUNICATIONS SERVICES PROVIDED TO A CUSTOMER PREMISES teaches an integrated system for processing a service request relating to installation, maintenance or repair of a local loop extending from a telecommunications company central office to a customer premise. Significantly, the Storch system can track the status of the service request, for example whether line conditioning equipment was installed or replaced.

Finally, U.S. Pat. No. 5,790,634 to Kinser et al. for COMBINATION SYSTEM FOR PROACTIVELY AND REACTIVELY MAINTAINING TELEPHONE NETWORK FACILITIES IN A PUBLIC SWITCHED TELEPHONE SYSTEM discloses a reactive and proactive system for detecting and correcting network facility faults and potential faults. Notably, the Kinser system automatically authorizes and prioritizes service based upon service requests and pre-defined criteria. Moreover, like the Storch system, the Kinser system also can track the progress of a service request.

Significantly, each of the Bergeron, Storch and Kinser systems has various inherent limitations and problems. For instance, these building system only respond to alarms and to diagnostic results produced by diagnostic programs. The systems cannot be configured to track and schedule the routine and preventative maintenance of building systems. In addition, though some of these automated systems, in response to detecting a system failure, can retrieve a list of available service providers to perform the repair or maintenance and can attempt to contact service providers sequentially in the list, none of these automated systems can attempt to determine which of the service providers have technicians geographically proximate to where repair or maintenance is required for the most expedient repair action.

Current automated systems also are limited in their ability to contact the service providers once the appropriate service provider has been located. Some of the existing automated systems rely solely on standard telephone communications. Others rely on e-mail or fax communications. Still, none of the existing automated system include methods of communication which can consistently and reliably alert a service provider of the need for repair or maintenance of a building system in a timely manner. Finally, current automated systems do not effectively track the status of a repair or maintenance. Moreover, current automated systems do not effectively track when a repair or maintenance has been completed. Likewise, current automated systems do not archive historical data as to the repair and maintenance for each building system. Thus, present building automation systems are deficient in their ability to monitor building systems, to selectively dispatch service providers for performing routine, preventative and unscheduled maintenance and repair, to track the progress of such dispatched service providers, and to maintain records of such repair and maintenance.

SUMMARY OF THE INVENTION

The invention is a method and system for automated building service brokering. The present invention automatically monitors multiple devices in multiple locations, locates and alerts services providers to repair or maintenance needs. The present invention further tracks the progress of the repair or maintenance, and maintains a history log of the relevant information relating to each device and each repair or maintenance request. In one embodiment of the invention, an automated building service broker can be communicatively linked to a plurality of building systems and to a plurality of service providers. Each service provider is deemed suitable for performing maintenance and repair on at least one of the building systems.

The automated building service broker can include a Global Positioning System (GPS) data processor for processing GPS data associated with the communicatively linked service providers the GPS data corresponding to a geographic position. The automated service broker also can include an event handler for responding to maintenance and repair events received from the communicatively linked building systems. Finally, the automated building service broker can include a service provider selector for selecting a particular service provider to respond to a particular received maintenance and repair event received from a particular communicatively linked building system. More particularly, the service provider can be selected based on whether the selected service provider is suitable to perform required maintenance and repair on the particular communicatively linked building system and based on the geographic position of the particular service provider (or group) relative to the particular building system as reported by GPS data associated with the particular service provider. Example of suitable service providers can include service providers having multiple years of experience repairing a particular building system, service providers specializing in the repair of particular types of building systems, or service providers having speciality certifications. In one aspect of this embodiment, the automated building services broker can further include an event log for recording and archiving received maintenance and repair events.

An automated building services broker system can include an automated building services broker. The automated service broker can have an event log database, a maintenance database, a service provider database, equipment database, and a historical database. The automated service broker also can include a table of the geographic positions of particular building sites. The system also can include a plurality of building sites, wherein each building site has a plurality of building systems and is communicatively linked to the automated building services broker. Notably, the automated building service broker can be located in a particular building site, or separate from the building sites. Finally, the system can include a plurality of service providers communicatively linked to the automated building services broker, wherein each the service provider can perform maintenance and repair on at least one of the building systems. In one aspect of the automated building service broker system, the system can include means for identifying geographic positions of the service providers.

Notably, each building site can include a control system for monitoring the building systems in the building site, wherein the control system can communicate with the automated building services broker over the communications links between the building site and the automated building services broker. In an alternative aspect of the automated building service broker system, each building system also can include a control system for monitoring the building system, wherein the control system can communicate with the automated building services broker over the communications links between the building site and the automated building services broker.

The communications link between the service providers and the automated building services broker can be a wireline link. Additionally, the communications link between the service providers and the automated building services broker can be a wireless link. Notably, the wireless link can be a pager-type communications network link. Also, the wireless link can be a cellular communications link. The communications link between the building sites and the automated building services broker also can be a data communications network.

An automated building service brokering method in accordance with the inventive arrangements can include the steps of electronically detecting a need for service in a building system in a building site or receive input from building site occupant; responsive to the detection, automatically selecting a service provider suitable for servicing the building system, the service provider selected from among a plurality of service providers suitable for servicing the building system; providing an electronic notification of the servicing need over a communications link to the selected service provider; and, monitoring the communications link for an electronic response to the electronic notification. Additionally, the method can include the step of monitoring secondary communications links for the electronic response.

In one aspect of the method, if no electronic response is received, the method can further include providing at least one additional notification to the selected service provider. Additionally, if no electronic response is received, the method can include automatically selecting an alternate service provider suitable for servicing the building system; providing an electronic notification to the selected service provider, where the alternate service provider is selected from among the plurality of service providers suitable for servicing the building system; and, monitoring the communications link for an electronic response to the electronic notification from the alternate service provider.

The step of detecting a need for service in a building system can include sensing an error condition in the building system. Alternatively, the detecting step can include receiving notification from a building site operator. Notably, in aspect of the method of the invention, the method also can include the step of maintaining a maintenance database for tracking routine building system maintenance, where the maintenance database includes at least one record which indicates a scheduled maintenance event for the building system. In this aspect of the method, the step of detecting a need for service in a building system can include identifying a scheduled maintenance event in the maintenance database. Additionally, the step of detecting a need for service in a building system further can also include sensing an error condition in the building system. This error condition can be manually provided by a building site operator.

The step of selecting a service provider suitable for servicing the building system can include querying suitable service providers from among the plurality of service providers for current geographic positions; and, based on the current geographic positions, selecting a service provider who is geographically proximate to the building site. More particularly, the querying step can include requesting current geographic positions from the suitable service providers; and, receiving from the suitable service providers, the requested current geographic positions derived from Global Positioning System (GPS) data.

The step of providing an electronic notification can include transmitting an electronic message to the selected service provider through a pager-type communications network. Moreover, the step of providing an electronic notification can include transmitting an electronic message to the selected service provider through a computer communications network. Finally, the step of providing an electronic notification can include transmitting an electronic message to the selected service provider through a wireless communications network.

Likewise, the step of monitoring the communications link for an electronic response to the electronic notification can include receiving an electronic message from the selected service provider through the pager-type communications network. Moreover, the step of monitoring the communications link for an electronic response to the electronic notification can include receiving an electronic message from the selected service provider through the computer communications network. Finally, the step of monitoring the communications link for an electronic response to the electronic notification can include receiving an electronic message from the selected service provider through the wireless communications network.

Significantly, the automated building service brokering method can also include the step of confirming that the selected service provider has responded to the electronic notification. Moreover, the method can include the step of tracking statistics associated with the confirmed response, wherein the statistics can include at least one of service response time, arrival time, and service completion time. The confirming step can include querying the selected service provider for a current geographic position; identifying a geographic position for the building site; and, comparing the current geographic position of the selected service provider to the geographic position of the building site. In consequence, the comparison can indicate how close the selected service provider is to the building site. Finally, the method can further include the steps of repeating the steps of querying and comparing. As such, the repeated querying and comparing can indicate whether the selected service provider is traveling toward or away from the building site, how fast the selected service provider is traveling toward or away from the building site, and, based on whether the selected service provider is traveling toward or away from the building site and how fast the selected service provider is traveling toward or away from the building site, when the selected service provider should arrive at the selected building site.

In another embodiment of the present invention, an automated building service brokering method can include transmitting to an automated building service broker geographic position data; receiving an electronic request from said automated building service broker to service a building system in a building site; responding to the electronic request with an electronic response; and, transmitting additional geographic positioning data to the automated building service broker after the step of responding. In this embodiment, the transmitting steps can include receiving from a Global Positioning System (GPS) receiver GPS data; and, transmitting the GPS data to the automated building service broker.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is an automated building service broker. An automated building service broker in accordance with the inventive arrangements can detect in a building system a need for service, either in response to a routine event or an error condition. Service request may be triggered by building site diagnostics, preventative maintenance routine, or an on-site operator via a keypad peripheral. Whether triggered by routine scheduled maintenance or a building system anomaly such as if the building system fails in operation, the building service broker can retrieve a list of service providers suitable for servicing the specified building system. In particular, a service provider can be selected from the list according to the geographic proximity of the selected service provider to the specified building system. Subsequently, the selected service provider can be notified of the event. The notification further can include the building site location and the nature of request. Additionally, the automated building service broker can automatically record the arrival of the service provider at the designated building site and can monitor the progress of the selected service provider in performing the requested repair or maintenance of the specified building system.

Figure 1:
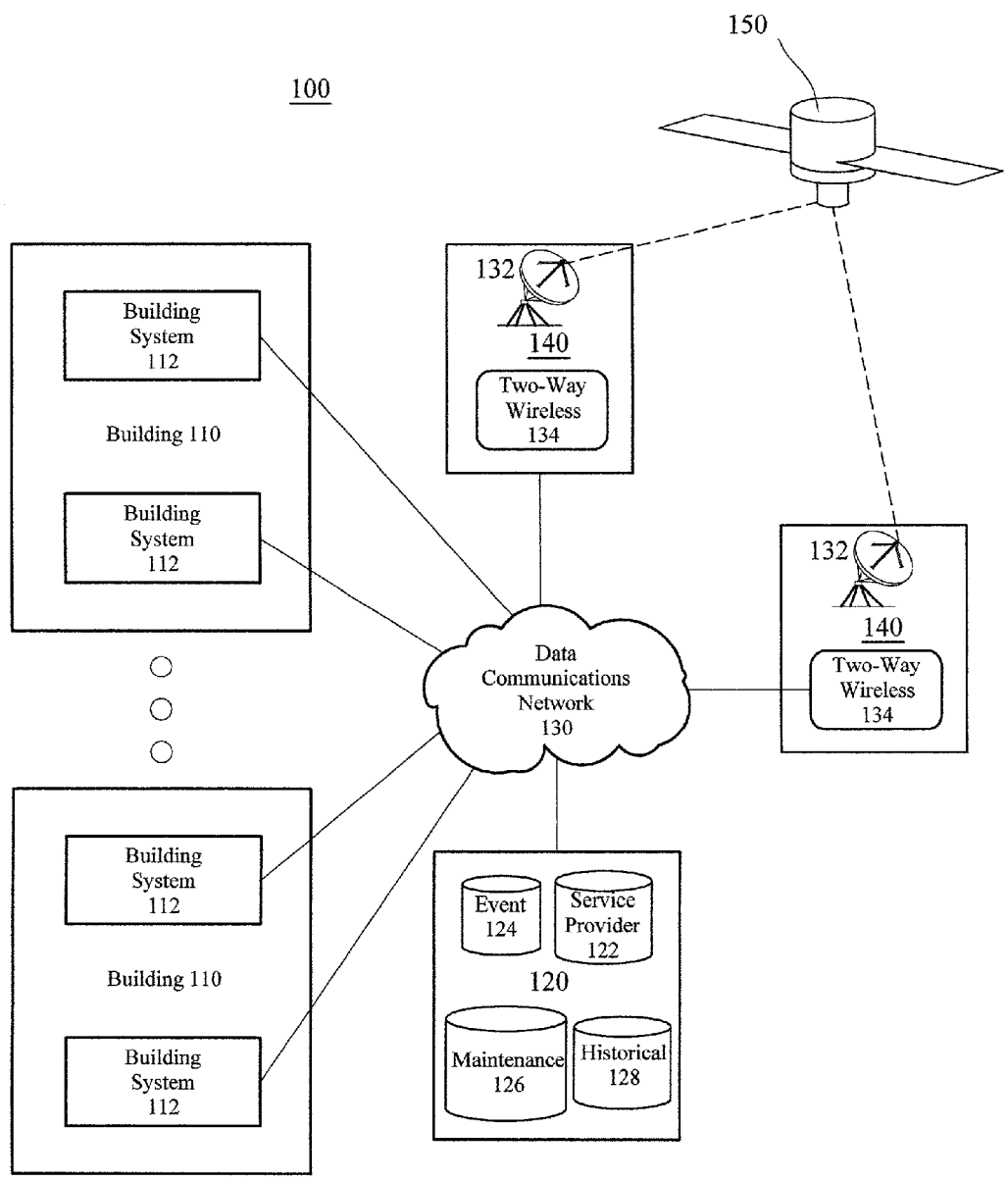
FIG. 1 is a schematic diagram of a preferred embodiment of the automated building service broker.

FIG. 1 illustrates a building automation system in accordance with the inventive arrangements. A building automation system 100 in accordance with the inventive arrangements can include a plurality of buildings 110 communicatively linked to a building services broker 120 through a data communications network 130. The building services broker 120 also can be communicatively linked to one or more service providers 140. Each building 110 can include therein one or more building systems 112. Exemplary building systems 112 can include, but are not limited, to air-conditioning systems, smoke detector systems, fire alarms systems, elevator/escalator systems, security systems, medical monitoring, etc.

Figure 2A:
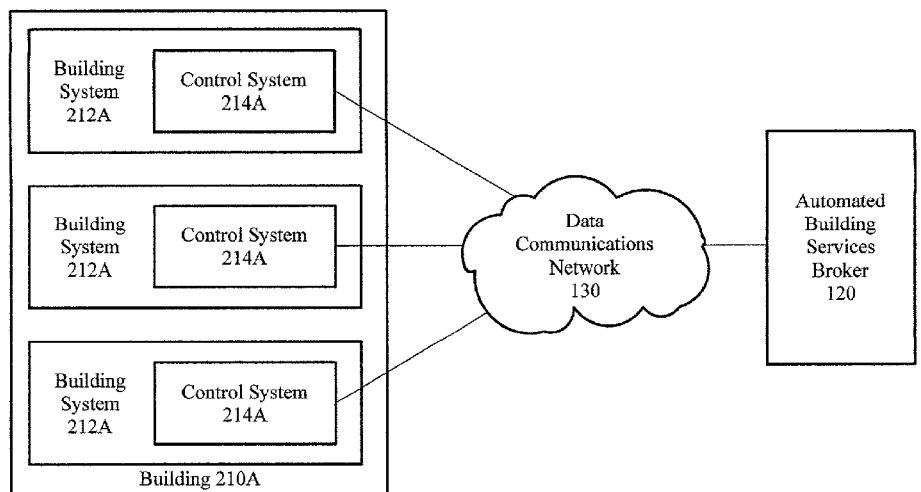
FIGS. 2A and 2B are schematic diagrams illustrating building site configurations suitable for use with the automated building service broker of FIG. 1
Figure 2B:
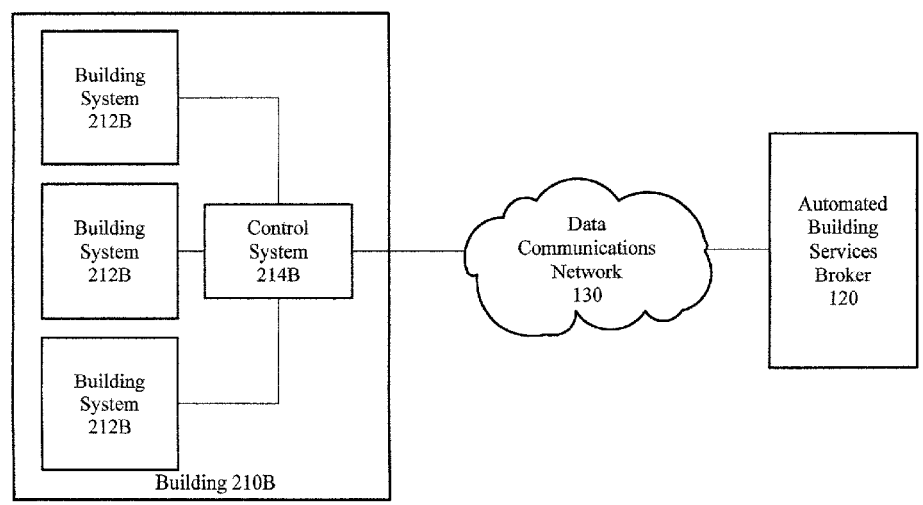

FIG. 2A illustrates an exemplary building 210A containing therein building systems 212A which can be individually communicatively linked to the data communications network 130. As shown in FIG. 2A, each building system 212A can include a control system 214A. The control system 214A can be used to monitor the status of building system 212A and can detect anomalies therein. Upon detecting an anomaly, the control system 214A can request from the automated building service broker 120 corresponding maintenance and repair. FIG. 2B illustrates an alternative exemplary building 210B containing therein building systems 212B which can be communicatively linked to the data communications network 130 through a central building control system 214B. The control system 214B can be used to monitor the status of each building system 212B in the building 212B and can detect anomalies therein. Additionally, the control system 214B can respond to both detected anomalies by requesting from the automated building service broker 120 corresponding maintenance and repair.

Returning now to FIG. 1, the automated building service broker 120 can include a database of service providers 122. Each service provider 140 listed in the database of service providers 122 can be associated with one or more building systems 112. Preferably, each building system 112 can have more than one associated service provider 140 so that the building services broker 120 can select a geographically suitable service provider from among many service providers 140. The automated service broker 120 further can maintain a maintenance database 124 in which preventative maintenance and repair events can be logged or archived. The automated services broker 120 also can log maintenance and repair events in an event database 126 which also can reference the location of the building site 112. Finally, the automated services broker 120 can include a history database 128 in which the progress of each requested repair can be tracked. Notably, the service provider, event, maintenance and history databases 122, 124, 126, 128 are not limited to single databases and multiple databases can be used to achieve the same end.

More particularly, each service provider 140 can include a Global Position System (GPS) receiver 132 and a wireless communications device 134 for providing data communications between the GPS receiver 132 and the automated building services broker 120. The GPS receiver 132 can be used to pinpoint the geographic location of the service provider 140. The GPS data can be communicated to the automated building services broker 120 either periodically or on demand. Notably, the communications device 134 can communicate with the automated building services broker 120 directly, for example through a wireless communications network. Examples of such wireless communications networks can include conventional cellular networks (both analog and digital) and PCS networks such as Cellular Digital Packet Data (CDPD) and Global System for Mobile Communication (GSM), as well as two way pager-type networks.

In operation, the automated building service broker can maintain a maintenance schedule for associated building systems. When the maintenance schedule determines that maintenance is due on one of the building systems, a maintenance record can be entered in an event log database. Subsequently, the service provider database can be consulted to identify a set of approved service providers for providing the scheduled maintenance. The automated building services broker can query each service provider in the set for a current geographic position as reported by the GPS receiver associated with each service provider.

Once the automated building services broker has determined the geographic position of each service provider in the set, the automated building services broker can determine which service provider is geographically closest to the building system in need of scheduled maintenance. As such, a group of service providers deemed closest can be selected and a maintenance request can be communicated to the selected service provider. The automated building services broker can notify the selected service provider of the maintenance request either electronically or manually. In the electronic case, the automated building services broker communicatively connect to the selected service provider via well known computer communications methods, for instance e-mail or instant messaging (IM) technology. Alternatively, the selected service provider can be notified by pager or by telephone. Subsequently, a maintenance record can be written to the history database indicating that a request has been sent to the selected service provider to perform the scheduled maintenance for the particular building system.

Alternatively, multiple service providers can be notified of the maintenance request through a broadcast message. The broadcast notification can include the building system at issue, the nature of the event and the building site location, although the invention is not limited in regard to the contents of the broadcast notification. Subsequently, the service providers receiving the broadcast message can respond with an estimated time of arrival (ETA) at the building site. Based on the ETA, or other factors such as geographic proximity or comparative suitability for performing the requested service (compared to other service providers receiving the broadcast message), a particular service provider can be selected.

Notably, the automated building services broker can confirm that the selected service provider has received and will respond to the maintenance request. In particular, the selected service provider can be required to respond electronically or manually. In one aspect of the invention, the selected service provider can respond with an ETA. In the case the selected service provider responds electronically, the selected service provider can communicatively connect to the automated building services broker through well known data communications methods, for instance by providing information through a Web interface, conventional client server interactions, etc. Alternatively, the service provider can transmit an e-mail to the automated building services broker which can be automatically parsed and processed by an e-mail agent of the automated building services broker. In the manual case, the selected service provider can respond by telephoning an operator having access to the automated building services broker, or by paging or e-mailing the operator.

Figure 3:
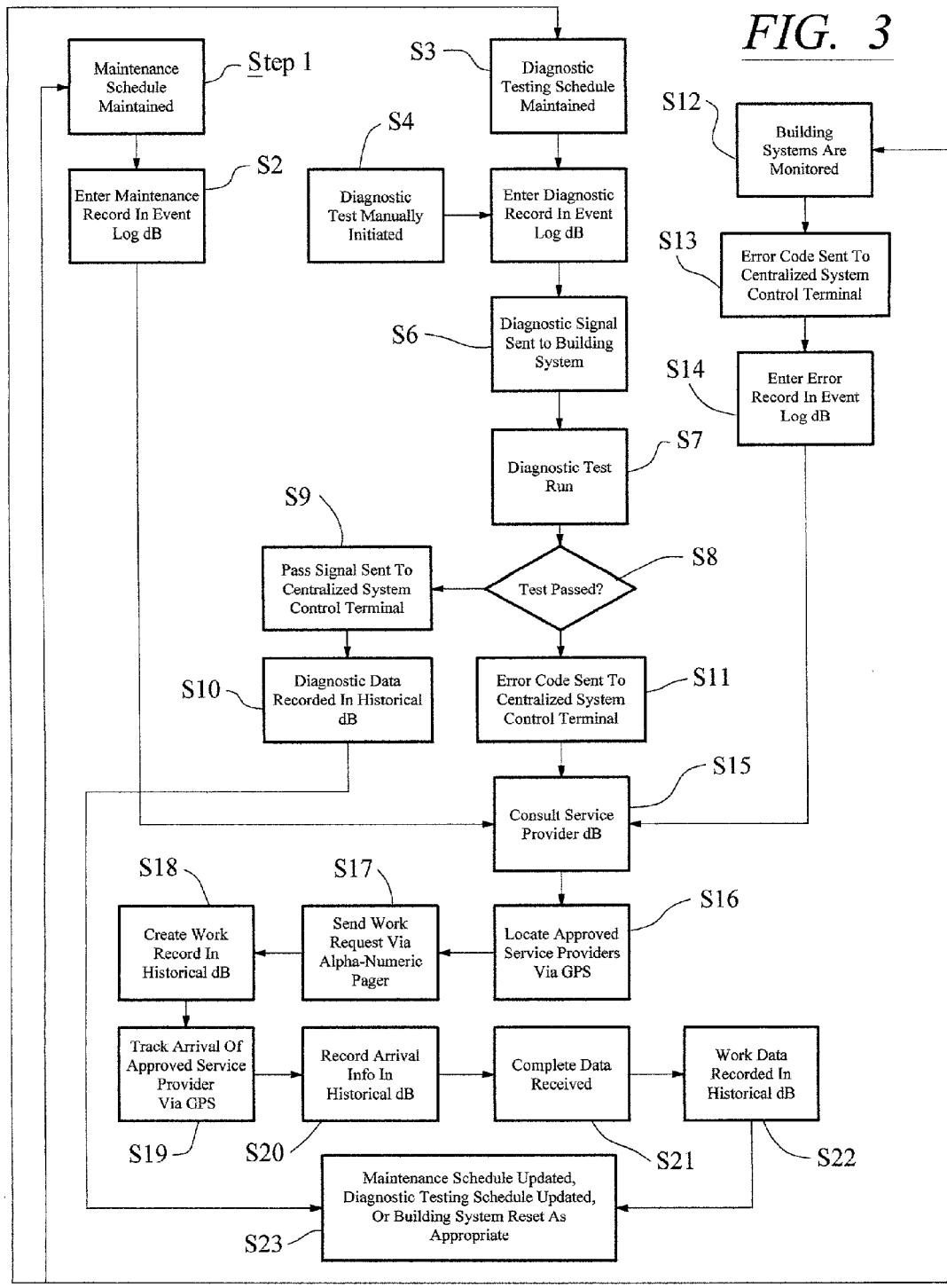
FIG. 3 is a flow chart illustrating a process automatically brokering building systems service requests in the automated building service broker of FIG. 1.

FIG. 3 is a flow chart illustrating a process in accordance with the inventive arrangements for brokering a building service request. Service requests can arise from routine scheduled maintenance, maintenance arising from the results of diagnostic testing performed on the building system, requests manually initiated by a building site operator, or the detection of an error condition in a building system. Accordingly, the process of brokering a building service request can begin in any of steps 1, 3 and 12.

Turning first to the case where a need for building service arises from routine scheduled maintenance, the process can begin in step 1 in which a maintenance database containing a maintenance schedule is maintained in the automated building services broker. The invention, however is not limited to the particular location of the maintenance database and the maintenance database can be located outside of the automated building services broker and accessed remotely by the automated building services broker. The maintenance database can contain store therein scheduled maintenance records which can associate particular building systems in particular building sites with scheduled maintenance events such that the maintenance schedule for each building system in each building site can be updated as required.

The automated building services broker can monitor the maintenance schedule for each building and, when observing a due scheduled maintenance event scheduled, in step 2 the automated building services broker can enter an event record in an event database. The event database can be used to store event records which correspond to a routine service event, the results of a diagnostic test, or the detection of an error condition. Like the maintenance database, the event database can be situated locally in the automated building services broker, or remotely in a distributed computing arrangement.

In step 15, having detected a need for building service, a service provider database can be consulted to identify those service providers whom are deemed suitable for servicing the particular detected need for building service. While any criteria for determining the suitability of a service provider can be used, in one aspect of the invention, the criteria can be expertise, cost and the geographic proximity of the service provider to the building site containing the building system which requires service. More particularly, once a set of suitable service providers has been identified in the service provider database, in step 16, the service providers in the set can be queried to identify a current position for each service provider. Specifically, an electronic request for location can be transmitted to each service provider, responsive to which the service providers can retrieve from their respective GPS units current location data. Subsequently, the service providers can electronically transmit the location data to the automated building services broker.

The automated building services broker can receive the location data and can compare the current locations of the service providers with the location of the building site containing the building system in need of service. The automated building services broker then can select a preferred service provider not only according to the distance separating the preferred service provider from the building site, but also according to the route available to the preferred service provider. More particularly, though a secondary service provider can be further from the building site than a primary service provider, the secondary service provider can have access to a freeway en route to the building site, while the primary service provider can only have access to rural roads.

In step 17, the preferred service provider can be selected and a work request transmitted to the service provider. The work request can contain the location of the building site and the nature of the service request. Notably, the work request can be electronically transmitted via alpha-numeric pager. More particularly, the work request can be transmitted from the automated building services broker through a two-way pager type communications network to a two-way pager at the service provider. Still, the invention is not limited in regard to the way in which the work request is transmitted. Rather, in other aspects of the invention, the work request can be electronically transmitted through a computer communications network via instant messenger, e-mail, connection-oriented communications (e.g. TCP/IP), or connectionless communications (e.g. UDP/IP). Moreover, the work request can be electronically transmitted via a telecommunications network in the form of a direct notification (voice notification) or indirect notification (e.g. voice mail). Notably, the voice notification or voice mail can be digitally generated.

Following transmission of the work request, in step 18, a work record can be created in a historical database in which historical maintenance records can be tracked. Moreover, the automated building services broker optionally can receive a confirmation notification from the selected service provider. Optionally, the confirmation notification can contain an ETA. Specifically, the selected service provider can transmit an accept work request or deny work request notification to the automated service broker through the same communications channel used to transmit the work request. In this way, the automated services broker can monitor the communications channel upon which a work request has been sent in order to confirm receipt of the work request and the acceptance or denial of the work request. Still, the invention is not limited neither in regard to whether a confirmation message is received by the automated building services broker, nor the communications method by which the confirmation message is transmitted to the automated building services broker.

If the selected service provider fails to respond to the work request, an additional work request can be transmitted to ensure the receipt of the work request by the selected service provider. Eventually, the non-response of the selected service provider can cause the automated building services broker to select an alternate service provider and the process can repeat. Also, if a deny work request message is received from the selected service provider, the work request can be transmitted to an alternate service provider. Notwithstanding, the invention is not limited to the process for confirming the receipt, acceptance or denial of a work request. Moreover, as before, work requests can be broadcast to multiple selected service providers. Depending upon the response of the multiple service providers, a particular service provider can be ultimately selected to perform the building system service.

In step 19, the automated building services broker can monitor the progress of the selected service provider in performing the required services on the building system. Specifically, the automated building services broker can periodically identify the geographic position of the selected service provider in order to determine whether the service provider is traveling towards the building site and at what rate. In step 20, when the selected service provider arrives at the building site, an arrival time can be logged in the historical database. In step 21, when the service provider has completed the required work on the building system, the service provider can transmit completion data to the automated building services broker. Such completion data can include, for example, the identify of the service provider, the diagnosed problem, the implemented solution, the type and quantity of parts used to perform the service, and the associated service charge for performing the requested service.

In step 22, the completion data can be recorded in the historical database. In consequence, the historical database can be subsequently reviewed and analyzed to identify servicing trends for particular building systems. Still, the invention is not limited to the type of data recorded in the historical database. Rather, the type of completion data to be stored in the historical database can be customized to reflect the particular requirements of an implementation of the invention. Finally, in step 23, the maintenance schedule in the maintenance database can be updated to reflect the completion of the scheduled maintenance on the building system.

Notably, service requests can arise not only from routine scheduled preventative maintenance, but also from the results of diagnostic testing performed on the building system, from manual entry by a building site operator, or the detection of an error condition in a building system. Notably, diagnostic testing can be performed periodically based on a real-time clock, or based on data in a real-time accumulator. The test may be triggered by ran-time accumulator or 365 day real time calendar clock. In step 3, the process can begin wherein a diagnostic testing database containing a diagnostic testing schedule is maintained in the automated building services broker. The invention, however is not limited to the particular location of the diagnostic testing database and the diagnostic testing database can be located outside of the automated building services broker and accessed remotely by the automated building services broker. The diagnostic testing database can contain store therein scheduled diagnostic testing records which can associate particular building systems in particular building sites with scheduled diagnostic testing events such that the diagnostic testing schedule for each building system in each building site can be updated as required.

The automated building services broker can monitor the diagnostic testing schedule for each building and, when observing a due scheduled diagnostic testing event, in step 5 the automated building services broker can enter an event record in the event database. Alternatively, an operator of the automated building services broker can initiate a manual diagnostic test of a selected building system in step 4. As in the case of schedule diagnostic testing, in the case of manual diagnostic testing, the automated building services broker can enter an event record in the event database.

Subsequently, in step 6 a diagnostic testing signal can be transmitted to the selected building system. The diagnostic testing signal can indicate to the building system to initiate a diagnostic testing routine. In step 7, the diagnostic testing routine can exercise various elements of the building system in order to determine whether any element requires servicing. In step 8, in can be determined whether any elements of the building system failed the diagnostic test. In step 9, if all elements of the building system passed the diagnostic test, a "pass signal" can be transmitted to the automated building services broker. Subsequently, in step 10, the diagnostic data can be stored in the historical database and in step 23 the diagnostic testing schedule in the diagnostic testing database can be updated.

In contrast, if in step 8 it is determined that one or more elements of the building system failed the diagnostic test, in step 11, an error code can be transmitted to the automated building services broker. Notably, the error code not only can indicate that the building system requires service, but also the error code can include additional information, for example, the particular element of the building system which failed the diagnostic test, or particular data points produced by the diagnostic test. Upon receiving the error code, the automated building services broker beginning in step 15 can repeat the process of selecting a service provider, notifying the service provider of the service request, and monitoring the progress of the selected service provider.

Finally, in step 12, the process can begin wherein each building system in a building site can be monitored. Through the monitoring process, an error condition can be detected and reported to the automated building services broker. Specifically, in step 13, upon detecting an error condition in a building system, an error code can be transmitted to the automated building services broker. Notably, the error code not only can indicate that the building system requires service, but also the error code can include additional information, for example, the particular element of the building system in which the error condition had been detected, or particular data points which triggered the error condition. In step 14, upon receiving the error code the automated building services broker can enter an event record in the event database. Finally, the automated building services broker beginning in step 15 can repeat the process of selecting a service provider, notifying the service provider of the service request, and monitoring the progress of the selected service provider.

The foregoing description of a preferred embodiment of the invention has been presented for purposes of illustration and description, and is not intended to be exhaustive or to limit the invention to the precise form disclosed. The description was selected to best explain the principles of the invention and their practical application to enable other skills in the art to best utilize the invention in various embodiments and various modifications as are suited to the particular use contemplated. It is intended that the scope of the invention not be limited by the specification, but be defined by the claims set forth below.

We claim:

1. An automated building service broker communicatively linked to a plurality of building systems and to a plurality of service providers, each service provider deemed suitable for performing maintenance and repair on at least one of the building systems, comprising:

a Global Positioning System (GPS) data processor for processing GPS data associated with the communicatively linked service providers, said GPS data corresponding to a geographic position;

an event handler for responding to building system maintenance and repair events received from the communicatively linked building systems; and, a service provider selector for selecting a particular service provider to respond to a particular received maintenance and repair event received from a particular communicatively linked building system, the selection being based on (a) whether said selected service provider is suitable to perform required maintenance and repair on the particular communicatively linked building system, and (b) the geographic position of the particular service provider relative to the particular building system as reported by GPS data associated with the particular service provider and wherein the service provider selector is configured to query a selected service provider for a current geographic position, to identify a geographic position using Global Positioning System (GPS) data for said building system, to compare said geographic position of said selected service provider to said geographic position of said building system, said comparison indicating how close said selected service provider is to said building system, and to repeat said steps of querying and comparing to determine whether said selected service provider is traveling toward or away from said building system, how fast said selected service provider is traveling toward or away from said building system, and, based on whether said selected service provider is traveling toward or away from said building site and how fast said selected service provider is traveling toward or away from said building system, to determine when said selected service provider should arrive at said building system.

2. The automated building services broker of claim 1, further comprising:

an event log for recording received building system maintenance and repair events.

3. An automated building services broker system, comprising:

an automated building services broker comprising an event handler for responding to building system maintenance and repair events, an event log database, a maintenance database, a service provider database, equipment database, and a historical database;

a plurality of building sites, each building site having at least one building system including a control system for performing at least one of monitoring a status of said at least one building system and detecting anomalies therein, each building site communicatively linked to said automated building services broken; and, a plurality of service providers communicatively linked to said automated building services broker, wherein each said service provider can perform maintenance and repair on at least one of said building systems, and wherein the service provider selector is configured to query a selected service provider for a current geographic position, to identify a geographic position using Global Positioning System (GPS) data for said building system, to compare said geographic position of said selected service provider to said geographic position of said building system, said comparison indicating how close said selected service provider is to said building system, and to repeat said steps of querying and comparing to determine whether said selected service provider is traveling toward or away from said building system, how fast said selected service provider is traveling toward or away from said building system, and, based on whether said selected service provider is traveling toward or away from said building system and how fast said selected service provider is traveling toward or away from said building system, to determine when said selected service provider should arrive at said building system.

4. The automated building service broker system of claim 3, further comprising:
means for identifying geographic positions of said service providers using Global Positioning System (GPS) data.

5. The automated building service broker system of claim 3, wherein said control system can communicate with said automated building services broker over said communications links between said building site and said automated building services broker.

6. The automated building service broker system of claim 3, wherein said control system monitors said at least one building system at a location apart from a building site wherein said at least one building system is located, and wherein said control system can communicate with said automated building services broker over said communications links between said building site and said automated building services broker.

7. The automated building service broker system of claim 3, wherein said communications link between said service providers and said automated building services broker is a wireless link.

8. The automated building service broker system of claim 7, wherein said wireless link is a pager-type communications network link.

9. The automated building service broker system of claim 3, wherein said communications link between said building sites and said automated building services broker is a data communications network.

10. An automated building service brokering method comprising;
electronically detecting a need for service in a building system in a building site;
responsive to said detection, automatically selecting a service provider suitable for servicing said building system, said service provider selected from among a plurality of service providers suitable for servicing said building system;

providing an electronic notification of said servicing need over a communications link to said selected service provider; and,
monitoring said communications link for an electronic response to said electronic notification querying said selected service provider for a current geographic position, identifying a geographic position using Global Positioning System (GPS) data for said building site, comparing said current geographic position of said selected service provider to said geographic position of said building site, and repeating said steps of querying and comparing, wherein said repeated querying and comparing can indicate whether said selected service provider is traveling toward or away from said building site, how fast said selected service provider is traveling toward or away from said building site, and, based on whether said selected service provider is traveling toward or away from said building site and how fast said selected service provider is traveling toward or away from said building site, to determine when said selected service provider should arrive at said building site.

11. The automated building service brokering method of claim 10, further comprising:
monitoring secondary communications links for said electronic response.

12. The automated building service brokering method of claim 10, further comprising:
if no electronic response is received, providing at least one additional notification to said selected service provider.

13. The automated building service brokering method of claim 10, further comprising:
if no electronic response is received, automatically selecting an alternate service provider suitable for servicing said building system;
providing an electronic notification to said selected service provider, said alternate service provider selected from among said plurality of service providers suitable for servicing said building system; and,
monitoring said communications link for an electronic response to said electronic notification from said alternate service provider.

14. The automated building service brokering method of claim 10, wherein said step of detecting a need for service in a building system comprises:
sensing an error condition in said building system.

15. The automated building service brokering method of claim 10, further comprising:
maintaining a maintenance database for tracking routine building system maintenance, said maintenance database comprising at least one record which indicates a scheduled maintenance event for said building system.

16. The automated building service brokering method of claim 10, wherein said step of detecting a need for service in a building system further comprises:
sensing an error condition in said building system.

17. The automated building service brokering method of claim 10, wherein said step of selecting a service provider suitable for servicing said building system comprises:
querying suitable service providers from among said plurality of service providers for current geographic positions; and,
based on said current geographic positions, selecting a service provider who is geographically proximate to said building site.

18. The automated building service brokering method of claim 17, wherein said querying step comprises:
   requesting current geographic positions from said suitable service providers; and,
   receiving from said suitable service providers, said requested current geographic positions derived from Global Positioning System (GPS) data.

19. The automated building service brokering method of claim 10, wherein said step of providing an electronic notification comprises:
   transmitting an electronic message to said selected service provider through a computer communications network.

20. The automated building service brokering method of claim 10, wherein said step of providing an electronic notification comprises:
   transmitting an electronic message to said selected service provider through a wireless communications network.

21. The automated building service brokering method of claim 20, wherein said step of monitoring said communications link for an electronic response to said electronic notification comprises:
   receiving an electronic message from said selected service provider through said wireless communications network.

22. The automated building service brokering method of claim 10, wherein said step of monitoring said communications link for an electronic response to said electronic notification comprises:
   receiving an electronic message from said selected service provider through said pager-type communications network.

23. The automated building service brokering method of claim 10, further comprising:
   confirming that said selected service provider has responded to said electronic notification.

24. The automated building service brokering method of claim 23, further comprising:
   tracking statistics associated with said confirmed response, said statistics comprising at least one of service response time, arrival time, and service completion time.

25. An automated building service brokering method comprising:
   transmitting to an automated building service broker geographic position data indicating a current geographic position of at least one service provider;
   receiving an electronic request from said automated building service broker to service a building system in a building site, said electronic request being sent in response to a maintenance event or error condition associated with said building system;
   responding to said electronic request with an electronic response, said electronic response being carried over a communications link monitored by said automated building service broker;
   transmitting additional geographic positioning data to said automated building service broker after said step of responding querying said service provider for a current geographic position, identifying a geographic position using Global Positioning System (GPS) data for said building site, comparing a current geographic location of a selected service provider to said geographic position of said building site, and repeating said steps of querying and comparing, wherein said repeated querying and comparing can indicate whether said selected service provider is traveling toward or away from said building site, how fast said selected service provider is traveling toward or away from said building site, and, based on whether said selected service provider is traveling toward or away from said building site and how fast said selected service provider is traveling toward or away from said building site, to determine when said selected service provider should arrive at said building site.

26. The automated building service brokering method of claim 25, wherein said transmitting steps comprise:
   receiving from a Global Positioning System (GPS) receiver GPS data; and,
   transmitting said GPS data to said automated building service broker.

27. A machine readable storage having stored thereon a computer program for automated building service brokering, said computer program having a plurality of code sections executable by a machine for causing the machine to perform the steps of:
   electronically detecting a need for service in a building system in a building site;
   responsive to said detection, automatically selecting a service provider suitable for servicing said building system, said service provider selected from among a plurality of service providers suitable for servicing said building system;
   providing an electronic notification of said servicing need over a communications link to said selected service provider;
   monitoring said communications link for an electronic response to said electronic notification querying said selected service provider for a current geographic position, identifying a geographic position using Global Positioning System (GPS) data for said building site, comparing said current position of a selected service provider to said geographic position of said building site, and repeating said steps of querying and comparing, wherein said repeated querying and comparing can indicate whether said selected service provider is traveling toward or away from said building site, how fast said selected service provider is traveling toward or away from said building site, and, based on whether said selected service provider is traveling toward or away from said building site and how fast said selected service provider is traveling toward or away from said building site, to determine when said selected service provider should arrive at said building site.

28. The machine readable storage of claim 27, further comprising:
   monitoring secondary communications links for said electronic response.

29. The machine readable storage of claim 27, further comprising:
   if no electronic response is received, providing at least one additional notification to said selected service provider.

30. The machine readable storage of claim 27, further comprising:
   if no electronic response is received, automatically selecting an alternate service provider suitable for servicing said building system;
   providing an electronic notification to said selected service provider, said alternate service provider selected from among said plurality of service providers suitable for servicing said building system; and,
   monitoring said communications link for an electronic response to said electronic notification from said alternate service provider.

31. The machine readable storage of claim 27, wherein said step of detecting a need for service in a building system comprises:
sensing an error condition in said building system.

32. The machine readable storage of claim 27, further comprising:
maintaining a maintenance database for tracking routine building system maintenance, said maintenance database comprising at least one record which indicates a scheduled maintenance event for said building system.

33. The machine readable storage of claim 27, wherein said step of detecting a need for service in a building system further comprises:
sensing an error condition in said building system.

34. The machine readable storage of claim 27, wherein said step of selecting a service provider suitable for servicing said building system comprises:
querying suitable service providers from among said plurality of service providers for current geographic positions; and,
based on said current geographic positions, selecting a service provider who is geographically proximate to said building site.

35. The machine readable storage of claim 34, wherein said querying step comprises:
requesting current geographic positions from said suitable service providers; and,
receiving from said suitable service providers, said requested current geographic positions derived from Global Positioning System (GPS) data.

36. The machine readable storage of claim 27, wherein said step of providing an electronic notification comprises:
transmitting an electronic message to said selected service provider trough a wireless communications network.

37. The machine readable storage of claim 36, wherein said step of monitoring said communications link for an electronic response to said electronic notification comprises:
receiving an electronic message from said selected service provider through said wireless communications network.

38. The machine readable storage of claim 27, wherein said step of monitoring said communications link for an electronic response to said electronic notification comprises:
receiving an electronic message from said selected service provider through said pager-type communications network.

39. The machine readable storage of claim 27, further comprising:
confirming that said selected service provider has responded to said electronic notification.

40. The machine readable storage of claim 39, further comprising:
tracking statistics associated with said confirmed response, said statistics comprising at least one of service response time, arrival time, and service completion time.

41. A machine readable storage having stored thereon a computer program for automated building service brokering, said computer program having a plurality of code sections executable by a machine for causing the machine to perform the steps of:
transmitting to an automated building service broker geographic position data indicating a current geographic position of at least one service provider;
receiving an electronic request from said automated building service broker to service a building system in a building site, said electronic request being sent in response to a maintenance event or error condition associated with said building system;
responding to said electronic request with an electronic response, said electronic response being carried over a communications link monitored by said automated building service broker;
transmitting additional geographic positioning data to said automated building service broker after said step of responding querying said service provider for a current geographic position, identifying a geographic position using Global Positioning System (GPS) data for said building site, comparing a current geographic location of a selected service provider to said geographic position of said building site, and repeating said steps of querying and comparing, wherein said repeated querying and comparing can indicate whether said selected service provider is traveling toward or away from said building site, how fast said selected service provider is traveling toward or away from said building site, and, based on whether said selected service provider is traveling toward or away from said building site and how fast said selected service provider is traveling toward or away from said building site, to determine when said selected service provider should arrive at said building site.

42. The machine readable storage of claim 41, wherein said transmitting steps comprise:
receiving from a Global Positioning System (GPS) receiver GPS data; and,
transmitting said GPS data to said automated building service broker.

* * * * *